United States Patent
Nelson et al.

(10) Patent No.: US 6,283,102 B1
(45) Date of Patent: Sep. 4, 2001

(54) FUEL IDENTIFIER ALGORITHM

(75) Inventors: Brian J. Nelson, Royal Oak; Joseph B. Adams, Northville; Luiz R. Alicke, Ann Arbor; Jason E. Wielenga, Jackson, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/433,895

(22) Filed: Nov. 4, 1999

(51) Int. Cl.[7] .................................................. F02B 13/00
(52) U.S. Cl. ........................ 123/575; 123/436; 123/1 A
(58) Field of Search .................... 73/35.02; 123/1 A, 123/575, 435, 436

(56) References Cited

U.S. PATENT DOCUMENTS

| | | |
|---|---|---|
| 5,226,396 * | 7/1993 | Bailey .................................. 123/1 A |
| 5,435,285 | 7/1995 | Adams et al. . |
| 5,537,978 * | 7/1996 | Watanabe .............................. 73/35.02 |
| 5,586,537 * | 12/1996 | Tomisawa et al. ................... 123/435 |
| 5,817,923 * | 10/1998 | Ohsaki et al. ........................ 73/35.02 |
| 5,881,703 | 3/1999 | Nankee et al. . |
| 5,893,349 * | 4/1999 | Rado ..................................... 123/435 |
| 5,901,671 | 5/1999 | Huff et al. . |
| 5,957,994 * | 9/1999 | Meyer et al. ......................... 123/436 |
| 6,016,796 * | 1/2000 | Dalton ................................... 123/1 A |
| 6,079,396 * | 6/2000 | Ament et al. ......................... 123/674 |

FOREIGN PATENT DOCUMENTS 4-252835 * 9/1992 (JP) .

* cited by examiner

*Primary Examiner*—Erick Solis
(74) *Attorney, Agent, or Firm*—Mark P. Calcaterra

(57) ABSTRACT

A method for identifying high driveability index fuel for use in a motor vehicle engine includes the steps of determining an engine rotational speed after the engine has started, measuring an elapsed time required for the engine rotational speed to increase from a predetermined low limit to a predetermined high limit, and identifying high driveability index fuel when the elapsed time is greater than a predetermined time limit.

20 Claims, 4 Drawing Sheets

FUEL IDENTIFIER ALGORITHM

BACKGROUND OF THE INVENTION

1. Technical Field

The present invention generally relates to a software algorithm for controlling the engine of a motor vehicle. More particularly, but without restriction to the specific embodiment and/or use which is shown and described for purposes of illustration, the present invention pertains to a fuel identifier algorithm capable of distinguishing the difference between normal fuel and high driveability index fuel.

2. Discussion

In recent years, the manufacturers of internal combustion engine fuel have began to offer a variety of different fuels having vaporization pressures to correspond with the climate in which they are sold. For example, fuels exhibiting a Reid vaporization pressure of approximately 7–9 psi are commonly sold in the warmer climate regions of the country or only during the summer. Similarly, fuels exhibiting Reid vaporization pressures of 12–14 psi are utilized primarily in the winter. By varying the vaporization pressure to correspond to the average daily temperature, the cold start characteristics of the internal combustion engine may be optimized.

One of the specific problems attempted to be solved by varying the vapor pressure of the fuel is a warm weather phenomenon known as vapor lock. If the ambient temperature is high and the fuel volatility or vapor pressure is also high, the fuel may vaporize on its way to the fuel injection system. Accordingly, the fuel will not pump and the engine will stall due to lack of fuel. Conversely, a different concern exists during cold weather. For example, an engine may fail to start during a cold weather snap if a fuel exhibiting a high driveability index or low vapor pressure is used. Specifically, the fuel may simply wet the walls of the cylinder without vaporizing thereby precluding combustion. Accordingly, the engine will not start and the fuel will be pumped through the combustion chambers and into the exhaust.

With the advent of the use of high driveability index fuel, engine control systems face a new challenge. Specifically, accommodations must be made to assure that the engine will start easily and meet strict emission standards regardless of ambient temperature or fuel type. This goal is more complex since fuels of high driveability index may be in the tanks of vehicles during a seasonal change or a cold snap. As emission standards are tightened, it becomes increasingly difficult to meet both the emission standard and an acceptable level of driveability robustness as determined by the customer. Accordingly, a need exists for a method to identify when high driveability index fuel is present and modify the enrichment/control strategy to compensate for the fuel's lower volatility.

In the past, systems commonly known in the art would simply enrich the mixture at start for all fuels in an attempt to assure an easy start. However, this strategy is no longer viable when evaluated using the emission standards of today. One of the greatest hurdles facing original equipment manufacturers is that the vehicle must meet not only a new car emission standard but must also pass an audit performed up to three years after the initial sale. Recently developed systems have attempted to assure that the emission standards were met over time by setting the initial enrichment to a goal maximum roughness setting equivalent to the most lean setting acceptable. This control strategy would allow the emissions level to increase over time as the engine components wear. However, if a fuel of lesser volatility were used, the engine would be pushed into roughness thereby dissatisfying the operator.

SUMMARY OF THE INVENTION

Accordingly, an object of the present is to provide a fuel identifier algorithm capable of identifying high driveability index fuel and modifying the enrichment strategy to compensate for low volatility fuel.

It is another object of the present invention to provide a fuel identifier algorithm for controlling an engine to operate within driveability robustness and emissions limitations while burning fuels of varying driveability index.

The present invention provides a method for identifying high driveability index fuel for use in a motor vehicle engine. The method includes the steps of determining an engine rotational speed after the engine has started, measuring an elapsed time required for the engine rotational speed to increase from a predetermined low limit to a predetermined high limit, and identifying high driveability index fuel when the elapsed time is greater than a predetermined time limit.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
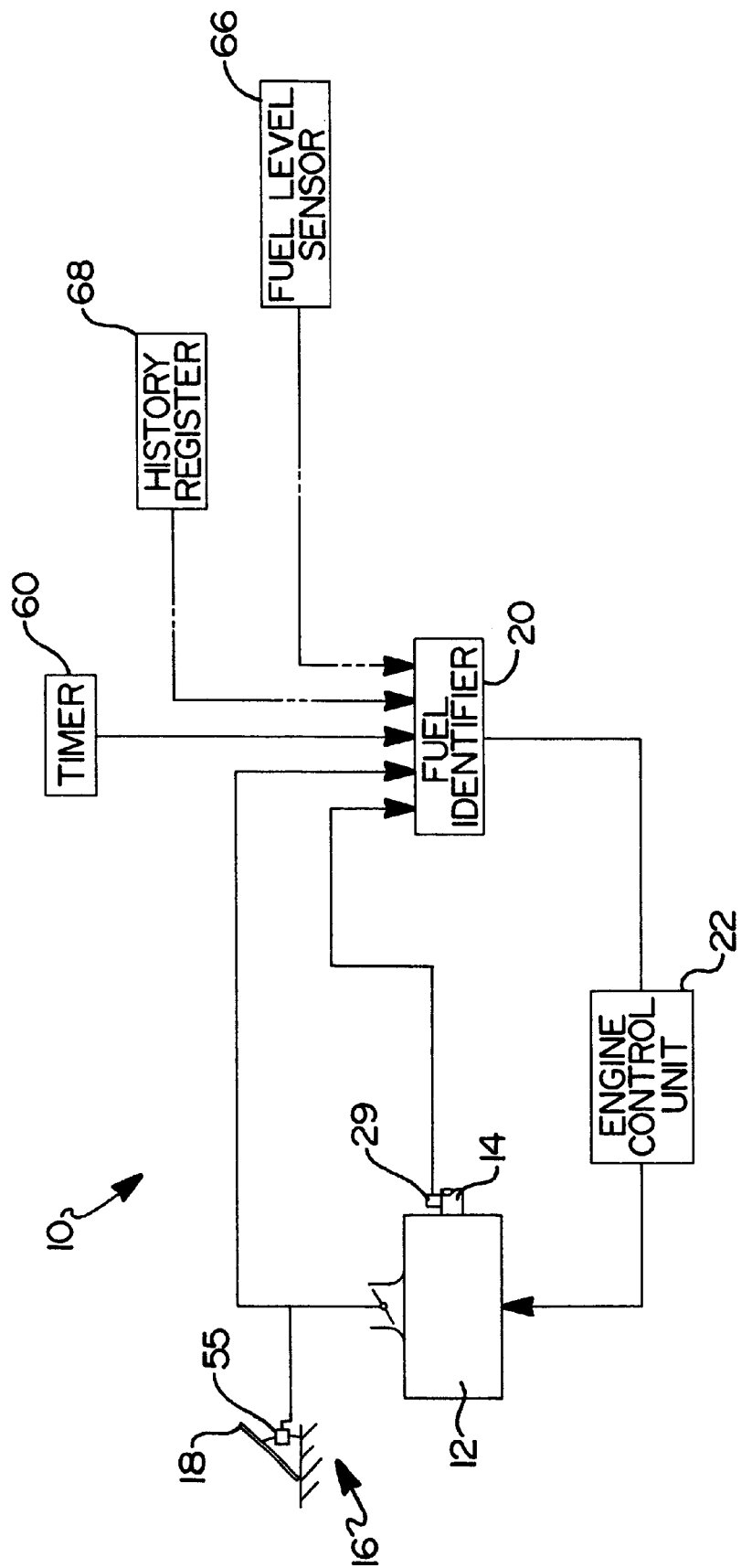
FIG. 1 is a schematic diagram of an exemplary motor vehicle engine control system including a fuel identifier algorithm according to the principles of the present invention.

With initial reference to FIG. 1, a motor vehicle engine control system constructed in accordance with the teachings of an embodiment of the present invention is generally identified at reference numeral 10. The motor vehicle engine control system 10 includes an engine 12 having an output shaft 14 for supplying power to driveline components and driven wheels (not shown). The engine 12 includes a fuel delivery system 16 for channeling atmospheric air and fuel to the combustion chambers. The fuel delivery system 16 includes an accelerator pedal 18 to provide an operator of the vehicle with a means for controlling the throttle position.

The engine control system 10 of the present invention further includes a fuel identifier algorithm depicted at block 20 in communication with an engine control unit 22 for determining the presence of high driveability index fuel.

Driveability index is a characterization of the volatility of a fuel. Specifically, the driveability index utilizes three factors commonly referred to as T 10, T 50, and T 90. T 10 is the temperature at which 10% of the fuel evaporates. T 50 is the temperature at which 50% of the fuel evaporates. Accordingly, T 90 is the temperature at which 90% of the fuel evaporates.

Driveability index=(1.5*T 10)+(3*T 50)+T 90. By definition, a fuel exhibiting a driveability index value greater than 1250 is categorized as a high driveability index fuel.

As mentioned earlier, a system capable of identifying fuel having a high driveability index is very valuable. In order to meet the driveability demands of the operator while maintaining engine emissions below the mandated standard, the fuel identifier algorithm 20 must direct the engine control unit 22 to adjust fuel enrichment and target roughness calibrations if high driveability index fuel is present. Normally, the engine 12 would hesitate and buck if high driveability index fuel were input without any adjustment in engine calibration.

Figure 2:
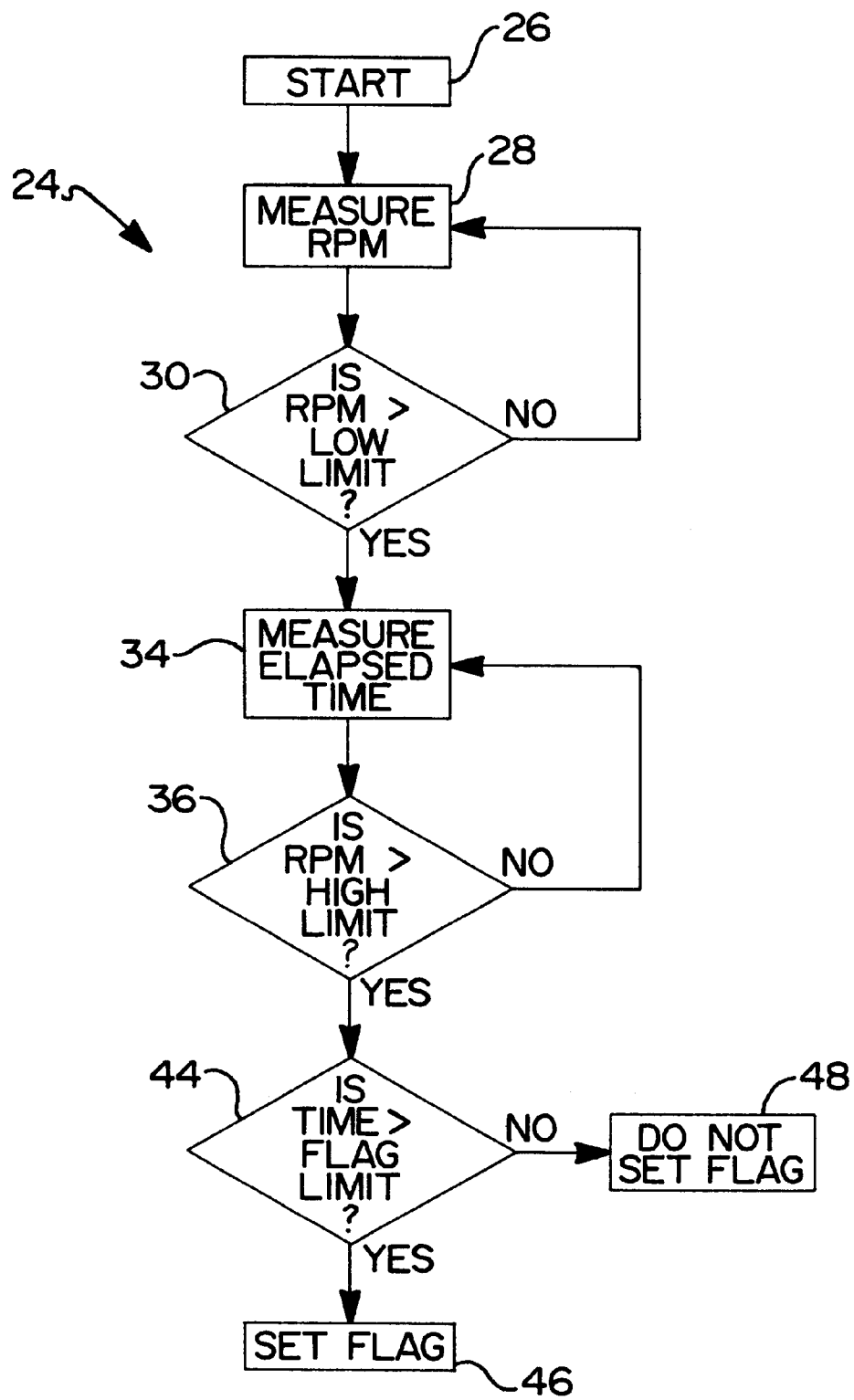
FIG. 2 is a flow diagram representative of the computer program instructions executed by the fuel identifier algorithm of the present invention.

Referring to FIG. 2, a global flow diagram representative of the computer program instructions executed by the fuel identifier algorithm 20 of the present invention is generally identified at reference numeral 24. At block 26, the algorithm begins once the vehicle engine 12 has been started. At block 28, the engine rotational speed or RPM is measured by an engine rotational speed sensor 29 (FIG. 1). One skilled in the art will appreciate that the rotational speed sensor 29 may include a variety of devices capable of determining engine rotational speed. Specifically, an encoder (not shown) outputs electrical pulses every certain number of degrees of rotation of the output shaft 14. The encoder may be used in combination with a timer to determine engine rotational speed. One skilled in the art will further appreciate that other methods and mechanisms for determining the engine rotational speed may be implemented without departing from the scope of the present invention. The fuel identifier algorithm 20 proceeds to block 30 where the data collected by the engine rotational speed sensor 29 is compared to a previously defined low limit 32. Once the low limit 32 has been reached, the fuel identifier algorithm 20 proceeds to a block 34 where the elapsed time is measured until the program proceeds past a block 36 which defines a high limit 38. Accordingly, the block 34 acts as a counter to determine the amount of time required for the engine rotational speed to increase from the low limit 32 to the high limit 38. The high limit 38 and the low limit 32 effectively define a window in which the start-flare characteristics of the engine 12 are evaluated.

Figure 3:
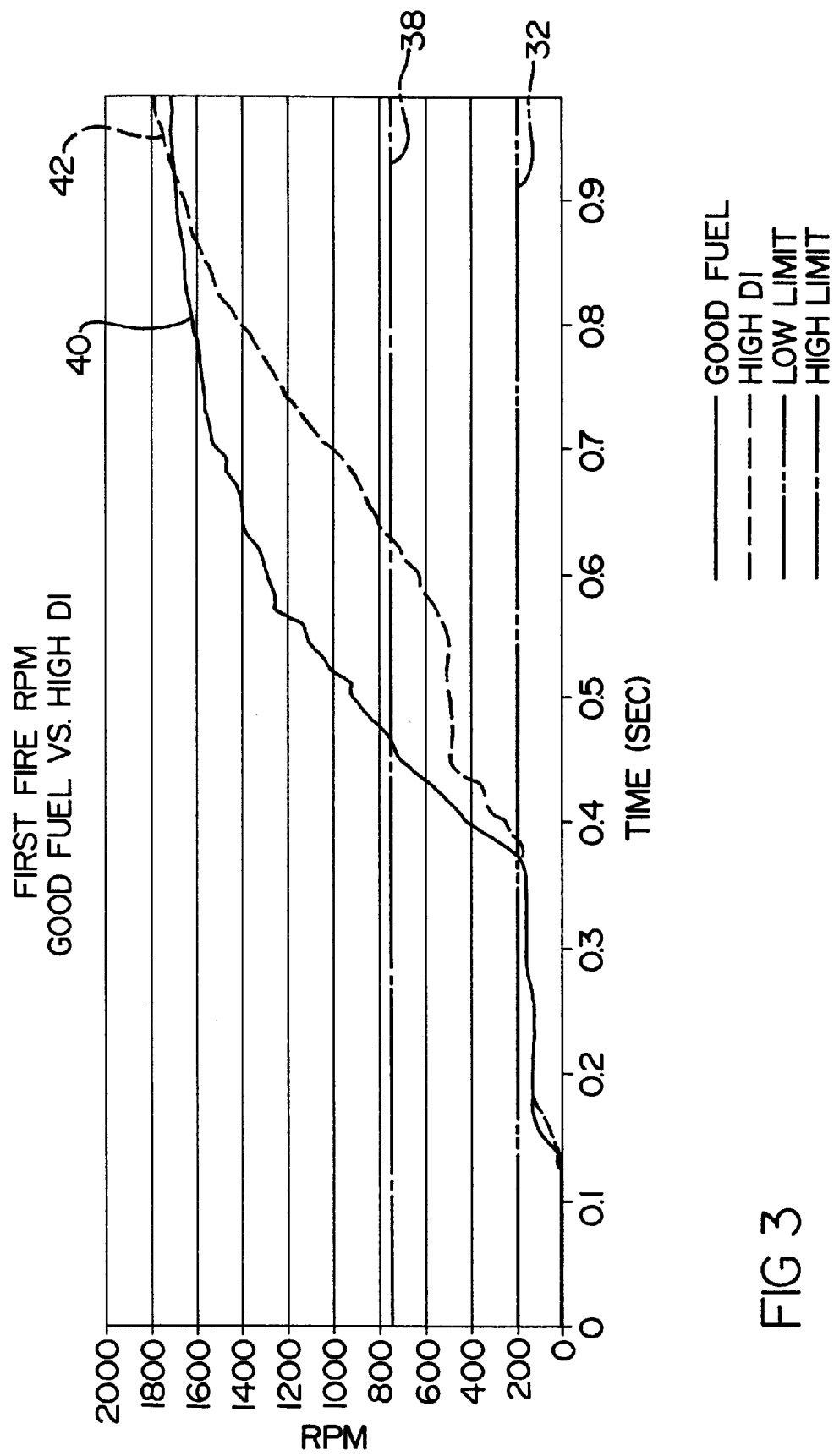
FIG. 3 is a graphic representation of the engine rotational speed of an engine fueled by standard fuel and an engine fueled by high driveability index fuel.

Referring to FIG. 3, two start-flare characteristic curves are shown plotting engine rotational speed for the first one second of running time. A first characteristic curve of an engine burning standard fuel is depicted at reference numeral 40. A second characteristic curve 42 representing the start-flare of an engine burning high driveability index fuel is also shown in FIG. 3. Empirical studies suggest that a statistically significant difference in the time required to pass from a low limit 32 equal to 200 RPM to a high limit 38 equal to 750 RPM exists when comparing an engine running on high driveability index fuel versus non-high driveability index or standard fuel. As FIG. 3 illustrates, the first characteristic curve 40 passes through the window of 200 RPM to 750 RPM in approximately 0.08 seconds. On the other hand, approximately 0.26 seconds elapse before the engine running on high driveability index fuel exhibits an engine rotational speed increase from 200 RPM to 750 RPM.

As shown in FIG. 2, once the RPM high limit has been met, the fuel identifier algorithm 20 proceeds to block 44 where the measured elapsed time calculated in block 34 is compared to a predetermined time limit. If the measured elapsed time is greater than the predetermined time limit, a high driveability index flag is set in block 46. If the measured elapsed time is less than the predetermined time limit, the flag will not be set as indicated in block 48. If the flag were to be set in block 46, the engine control unit 22 would be directed to modify a variety of engine control parameters to account for the high driveability index fuel.

One skilled in the art will appreciate that in order to create a robust fuel identifier algorithm 20, care must be taken to avoid falsely setting the flag when high driveability index fuel is not present. Accordingly, a statistical study compiling data from a variety of engines utilizing at least three different fuel types was conducted. As referenced earlier, the engines burning fuel having a driveability index of less than 1250 exhibited an average elapsed time to traverse the window of 200 RPM to 750 RPM in 0.08 seconds. Engines running fuel having a driveability index greater than 1250 took an average of 0.26 seconds to traverse the RPM window previously defined. In order to assure that the high driveability index flag is set only when high driveability index fuel is present, an elapsed time of 0.2 seconds was chosen as the time limit after which the high driveability index flag will be set. One skilled in the art will appreciate that the high driveability index flag may be set at any time depending on the statistical differences between the two populations of data collected.

Once the high driveability index flag has been set in block 46, a number of actions may be taken. In the preferred embodiment, the engine control unit 22 is directed to adjust the parameters within a dynamic crankshaft fuel control system. Under normal operating conditions when the high driveability index fuel flag is not set, the dynamic crankshaft fuel control system operates at a goal roughness equivalent to a very lean mixture. The lean mixture is utilized to assure that the vehicle passes an emissions standard test three or more years after the initial sale of the vehicle. By definition, the goal roughness corresponds to the most lean mixture of fuel capable of starting the engine and providing satisfactory driving robustness to the vehicle operator. As noted earlier, if the goal roughness is not modified, the presence of high driveability index fuel pushes the system into roughness.

In addition, the dynamic crankshaft fuel control system includes a rate of change parameter similar to the integral term of a proportional, integral, derivative control system. The rate of change parameter defines how aggressively the system tries to reach the roughness setting once the engine is running. If the rate of change term is large, the engine control unit 22 modifies the fuel supply in course steps in order to quickly change the engine rotation speed. However, a control system utilizing such an aggressive modification plan often times over-shoots the target. In the case of an engine utilizing high driveability index fuel, an aggressive correction system may overshoot the target roughness by pulling out too much fuel thereby causing the engine to buck or stall. Because the high driveability index fuel is less volatile, the rate of change term of the dynamic crankshaft fuel control system must be less aggressive when a request to reduce the amount of fuel is made. Conversely, if the dynamic crankshaft fuel control system is requesting an increase in fuel, an aggressive adjustment may still be appropriate.

Figure 4:
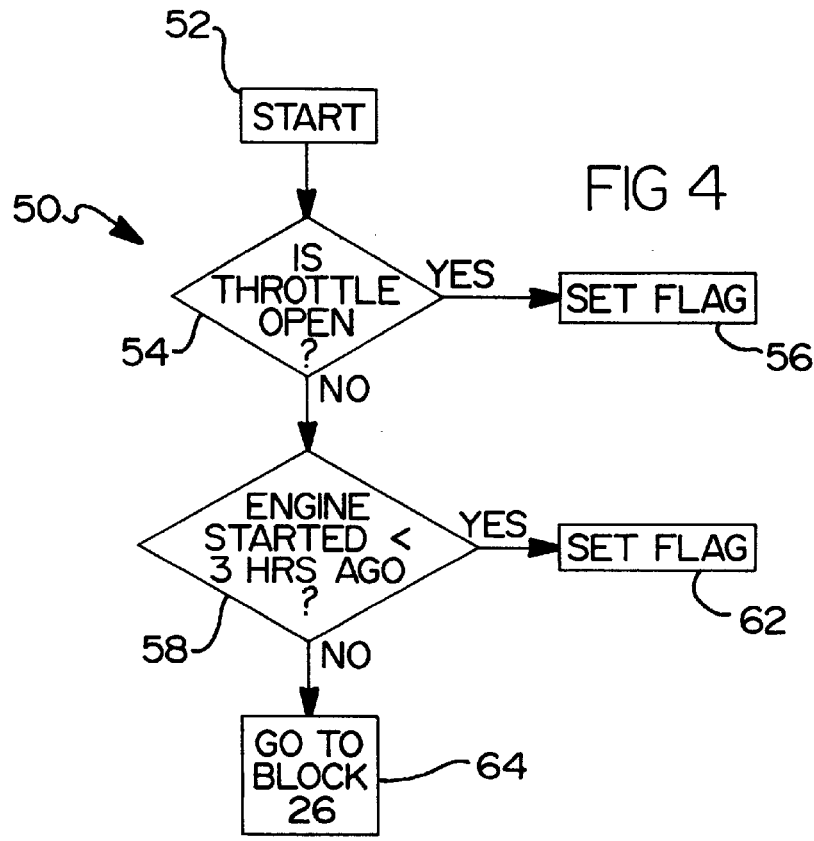
FIG. 4 is a flow diagram representative of the computer program instructions executed by an initiation routine of the present invention.

Referring to FIG. 4, a flow diagram representative of the computer program instructions executed by an initiation subroutine of the fuel identifier algorithm 20 is generally identified at reference numeral 50. At block 52, the initiation subroutine is invoked once the ignition is turned on. A series of checks are made to protect against failing to set the flag when high driveability index fuel is present. Specifically, the high driveability index flag is forced to set if, as shown in block 54, the throttle is open. An accelerator position sensor 55 (FIG. 2) notifies the fuel identifier algorithm 20 if the accelerator is depressed by an operator thereby opening the throttle. If the throttle is open during start, the engine 12 will race through the 200 to 750 RPM window regardless of the fuel type. Therefore, the fuel identifier algorithm will be unable to determine if high driveability index fuel is present. As a fail safe, the flag is set in block 56.

An additional step to be performed within the initiation subroutine 50 occurs in block 58. In block 58, the fuel identifier algorithm 20 accepts data from a timer 60 (FIG. 2) to determine if the engine 12 was running less than three hours prior to the current start attempt. If the engine 12 was running less than three hours prior to the current start attempt, the high driveability index fuel flag is forced to set in block 62. Once again, this procedure protects against failing to set the flag when high driveability index fuel is present. If the engine 12 was running less than three hours prior to the current start attempt, the engine is very likely to be at a temperature greater than ambient. Accordingly, the engine rotational speed of the engine 12 will quickly pass through the RPM range from 200 to 750 regardless of the type of fuel present. However, if the conditions noted in blocks 54 and 58 have not occurred, block 64 of the initiation subroutine 50 directs the fuel identifier algorithm 20 to begin at block 26 as referenced earlier.

As shown in FIG. 2, a second embodiment of the fuel identifier algorithm 20 includes a fuel level sensor 66 for switching the fuel identifier algorithm 20 from an inoperable mode to an operable mode. Specifically, the fuel identifier algorithm 20 will be placed in the operable mode and subsequently check for high driveability index fuel only after fuel has been added to the storage tank. Accordingly, if no new fuel has been added between consecutive engine starts, there is no need to check for high driveability index fuel. In this manner, false triggers of the presence of high driveability index fuel will be greatly reduced.

In similar fashion, a third embodiment of the fuel identifier algorithm 20 of the present invention includes a history register 68. The history register 68 maintains a record of when the high driveability index fuel flag was set in the past. The history register 68 is utilized as an input to the fuel identifier algorithm 20. If the flag has been set a certain numbers of times in the past, the flag will remain set unless fuel has been added to the tank and a certain number of "clean" starts are recorded.

Figure 5:
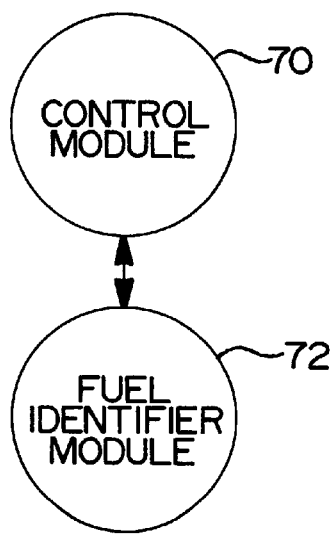
FIG. 5 is a logic diagram showing a graphical representation of the stabilizing system of the present invention.

In addition, the afore-mentioned logical steps may be performed by individual modules in communication with each other as shown in FIG. 5. Specifically, a control module 70 is in communication with a fuel identifier module 72 where the presence of high driveability index fuel is determined. One skilled in the art will appreciate that the control module 70 may directly control the engine 12 or may signal the engine control unit 22 to act.

In an alternative embodiment, the fuel identifier module is in communication with an initialization module. The initialization module functions to set the high driveability flag when certain earlier identified conditions are present. In yet another embodiment, the initialization module may be utilized to shift the fuel identifier module from an operable mode to an inoperable mode.

It is intended that the invention not be limited to the particular embodiments illustrated by the drawings and described in the specification contemplated for carrying out this invention, but that the invention will include any embodiment falling within the description of the appended claims.

What is claimed is:

1. A method for identifying high driveability index fuel for use in a motor vehicle engine, the method comprising the steps of:
   determining an engine rotational speed;
   beginning to measure an elapsed time once said engine rotational speed reaches a predetermined low limit
   ceasing to measure said elasped time once said engine rotational speed reaches a predetermined high limit wherein said predetermined low limit and said predetermined high limit define a window capturing the lowest rate of said engine rotational speed; and
   identifying high driveability index fuel when said elapsed time is greater than a predetermined time limit.

2. The method of claim 1 wherein said step of determining an engine rotational speed includes measuring said engine rotational speed for a period of time after the engine is started.

3. The method of claim 1 wherein said predetermined time limit is greater than the time required for an engine burning non-high driveability index fuel to pass from said predetermined low limit to said predetermined high limit.

4. The method of claim 1 wherein said predetermined time limit ranges from about 0.08 to 0.26 seconds.

5. The method of claim 1 wherein said predetermined low limit and said predetermined high limit define a window capturing the lowest rate of increase of said engine rotational speed.

6. A method for controlling an engine of a motor vehicle comprising the steps of:
   determining an engine rotational speed;
   measuring a rate of increase of said engine rotational speed from a predetermined low limit to a predetermined high limit; and
   determining if a high driveability index fuel is present by comparing said rate of increase to a predetermined rate; and
   modifying an engine control parameter to account for the presence of said high driveability index fuel by revising a roughness goal to compensate for the lesser volatility of said high driveability index fuel.

7. The method of claim 6 wherein said step of modifying an engine control parameter includes revising a roughness goal to compensate for the lesser volatility of said high driveability index fuel.

8. The method of claim 6 wherein said step of modifying an engine control parameter includes modifying a rate of change in which said roughness goal is reached.

9. The method of claim 6 wherein the step of modifying an engine control parameter includes implementing a less aggressive correction factor when said engine rotational speed is greater than a target speed.

10. The method of claim 6 wherein said low limit and said high limit are less than 2000 revolutions per minute.

11. The method of claim 10 wherein said low limit is about 200 revolutions per minute.

12. The method of claim 10 wherein said high limit is about 750 revolutions per minute.

13. A method for controlling an engine of a motor vehicle comprising the steps of:

determining an engine rotational speed;

measuring a rate of increase of said engine rotational speed from a predetermined low limit to a predetermined high limit;

determining if a high driveability index fuel is present by comparing said rate of increase to a predetermined rate;

determining when a throttle is open; and modifying an engine control parameter to account for the presence of said high driveability index fuel if said throttle is open when the engine is started.

14. A method for controlling an engine of a motor vehicle comprising the steps of:

determining an engine rotational speed;

measuring a rate of increase of said engine rotational speed from a predetermined low limit to a predetermined high limit;

determining if a high driveability index fuel is present by comparing said rate of increase to a predetermined rate;

determining when the engine was last run; and modifying an engine control parameter to account for the presence of said high driveability index fuel if the engine was run in less than a predefined time period.

15. An engine control system for a motor vehicle comprising:

a control module and a fuel identifier module for determining the presence of a high driveability index fuel, said fuel identifier module in communication with said control module, said control module notifying said engine control system if said high driveability index fuel is present comprising a counter to determine a length of time for an engine rotational speed to pass from a low limit to a high limit and wherein said length of time ranges from about 0.08 seconds to 0.26 seconds.

16. The engine control system for a motor vehicle of claim 15 wherein said fuel identifier module includes a counter to determine a length of time for an engine rotational speed to pass from a low limit to a high limit.

17. The engine control system for a motor vehicle of claim 16 wherein said length of time ranges from about 0.08 seconds to 0.26 seconds.

18. The engine control system for a motor vehicle of claim 15 further including an initialization module for switching said fuel identifier module from an inoperable mode to an operable mode.

19. The engine control system for a motor vehicle of claim 18 wherein said initialization module includes a fuel level sensor, said fuel level sensor signaling said initialization module to switch said fuel identifier module into said operable mode when fuel has been added.

20. An engine control system for a motor vehicle comprising:

a control module;

a fuel identifier module for determining the presence of a high driveability index fuel, said fuel identifier module in communication with said control module, said control module notifying said engine control system if said high driveability index fuel is present; and an initialization module includes a history register to record the presence of said high driveability index fuel over time, said initialization module sending a signal indicating the presence of high driveability index fuel if the history register contains a certain frequency of records.

* * * * *